United States Patent
Al-Khatib et al.

(10) Patent No.: US 11,435,492 B2
(45) Date of Patent: Sep. 6, 2022

(54) METHOD FOR IMPROVING SEISMIC ACQUISITIONS UTILISING ACTIVE ULTRALIGHT SEISMIC DETECTION SYSTEMS

(71) Applicant: Spotlight, Paris (FR)

(72) Inventors: Habib Al-Khatib, Paris (FR); Elodie Morgan, Paris (FR)

(73) Assignee: SPOTLIGHT, Paris (FR)

( * ) Notice: Subject to any disclaimer, the term of this patent is extended or adjusted under 35 U.S.C. 154(b) by 396 days.

(21) Appl. No.: 16/465,669

(22) PCT Filed: Nov. 28, 2017

(86) PCT No.: PCT/EP2017/080582
§ 371 (c)(1),
(2) Date: May 31, 2019

(87) PCT Pub. No.: WO2018/099880
PCT Pub. Date: Jun. 7, 2018

(65) Prior Publication Data
US 2019/0302299 A1    Oct. 3, 2019

(30) Foreign Application Priority Data

Dec. 2, 2016 (FR) ........................................ 1661842
Jul. 25, 2017 (FR) ........................................ 1757024

(51) Int. Cl.
*G01V 1/00* (2006.01)
*G01V 1/38* (2006.01)
(Continued)

(52) U.S. Cl.
CPC ............ *G01V 1/3808* (2013.01); *G01V 1/003* (2013.01); *G01V 1/282* (2013.01); *G01V 1/308* (2013.01);
(Continued)

(58) Field of Classification Search
CPC ...... G01V 1/3808; G01V 1/003; G01V 1/282; G01V 1/308; G01V 1/3817; G01V 2210/612
See application file for complete search history.

(56) References Cited

U.S. PATENT DOCUMENTS 4,188,610 A  *  2/1980  Nelson ................... G01V 1/005
                                                        367/14
10,088,588 B2 * 10/2018  Zhang .................... G01V 1/301
(Continued)

FOREIGN PATENT DOCUMENTS

CN            102944897 B        7/2015

OTHER PUBLICATIONS

International Search Report For Serial No. PCT/EP2017/080582 dated Apr. 3, 2018.

*Primary Examiner* — Mohamed Charioui
*Assistant Examiner* — Christine Y Liao
(74) *Attorney, Agent, or Firm* — McCormick, Paulding & Huber PLLC

(57) ABSTRACT

The present invention concerns a method for determining the optimum positioning of source-receiver pairs capable of acquiring seismic data, comprising: a first step of identifying a zone of interest having been the subject of an earlier seismic acquisition, in order to obtain an image of the subsoil of same; a second step of obtaining seismic data acquired during the earlier seismic acquisition of said zone of interest during a time of interest; a third step of applying a partial or total demigration of seismic data, in order to determine the positions of each source-receiver pair having contributed to the image of said subsoil of said zone of interest during said time of interest; a fourth step of obtaining unprocessed traces for said source-receiver pair positions; a fifth step of selecting at least one optimum unprocessed trace from among said unprocessed traces; and a
(Continued)

sixth step of determining the source-receiver pair positions corresponding to said at least one optimum unprocessed trace.

20 Claims, 6 Drawing Sheets

(51) Int. Cl.
*G01V 1/28* (2006.01)
*G01V 1/30* (2006.01)

(52) U.S. Cl.
CPC ...... *G01V 1/3817* (2013.01); *G01V 2210/612* (2013.01)

(56) References Cited

U.S. PATENT DOCUMENTS

| | | | |
|---|---|---|---|
| 2004/0006430 A1* | 1/2004 | Harmon | G01V 11/002 |
| | | | 702/14 |
| 2009/0052280 A1 | 2/2009 | Herrmann et al. | |
| 2009/0290449 A1* | 11/2009 | Smith | G01V 1/28 |
| | | | 367/38 |
| 2010/0080081 A1 | 4/2010 | Morgan et al. | |
| 2011/0194378 A1* | 8/2011 | Decker | G01V 1/005 |
| | | | 367/40 |
| 2011/0273959 A1 | 11/2011 | Jin et al. | |
| 2012/0014217 A1* | 1/2012 | Houck | G01V 1/308 |
| | | | 367/72 |
| 2016/0161620 A1 | 6/2016 | Hoeber et al. | |
| 2016/0162613 A1 | 6/2016 | Shevchenko et al. | |
| 2017/0139065 A1* | 5/2017 | Gentilhomme | G01V 1/282 |
| 2017/0242141 A1* | 8/2017 | Cotton | G01V 1/30 |

* cited by examiner

METHOD FOR IMPROVING SEISMIC ACQUISITIONS UTILISING ACTIVE ULTRALIGHT SEISMIC DETECTION SYSTEMS

CROSS-REFERENCE TO RELATED APPLICATIONS

This application is a National Stage application of International Patent Application No. PCT/EP2017/080582, filed on Nov. 28, 2017, which claims priority to French Patent Application No. 1661842, filed on Dec. 2, 2016; and French Patent Application No. 1757024, filed on Jul. 25, 2017, each of which is hereby incorporated by reference in its entirety.

TECHNICAL FIELD

The present invention generally relates to the acquisition of seismic data in land and sea areas.

BACKGROUND

It is known from the prior art that the acquisition of seismic data makes it possible to generate an image of the geophysical structure of the subsoil. Although this image does not make it possible to precisely indicate the localisation of natural resources, such as oil or gas, is does make it possible however, for a person skilled in the art, to determine the presence or absence of these resources. Thus, the continuous production of such images forms an integral part of the process of exploring subsoils for the purpose of discovering these natural resources. In order to produce these images, several methods are known from the prior art. For exploration at sea, it is possible to implement a boat drawing seismic streamers. These streamers can be arranged horizontally, at a constant depth with respect to the bottom of the sea. The boat also draws a set of seismic sources capable of generating seismic waves. These seismic waves propagate to the bottom of the sea and pass through it in order to penetrate it until they encounter a reflective structure to thus reflect them. These reflected seismic waves propagate towards the surface of the sea until they are detected by seismic sensors integrated into the streamers. Based on this seismic data, it is thus possible to generate an image of the subsoil. If one single streamer is used, this is referred to as a 2D image. If several streamers are used, drawn simultaneously by the boat, this is referred to as a 3D image. A 4D image is obtained when two 3D seismic acquisitions are carried out in the same zone, but with a shift in time. The first acquisition is carried out at time t0 and the second at a time t0+t, t able to be equal to several months or several years, for example.

Alternatively, it is also possible to record seismic data using cables or sensors placed at the bottom of the sea, these techniques are called ocean bottom cables (OBC), ocean bottom nodes (OBN) or ocean bottom seismometers (OBS). For example, in the case of an OBC acquisition, a plurality of sensors are connected together in a cable. Several of these cables are then installed at the bottom of the sea, in the zone to be surveyed. It is also possible to incorporate one or more sensors in an undersea aquatic vehicle. This vehicle, possibly autonomous, is placed at the bottom of the sea in order to record seismic data. It is then retrieved by a boat in order to transfer thereto this seismic data.

In the case of a land seismic acquisition, a system dedicated to a 4D acquisition comprises several sensors, for example hydrophones or accelerometers, positioned on a zone where it is desired to explore the subsoil. These sensors are in contact with the ground. Several seismic sources are also placed on the ground, in the zone to be surveyed. A recording device is connected to the sensors and located, for example, in a lorry. Each seismic source comprises a variable number of vibrators, typically between one and five, and can also comprise a local controller. A central controller can be present in order to coordinate the firing times of the seismic sources. A GPS system can be implemented in order to correlate over time the firing of the sources and the data acquired by the sensors. In this configuration, the seismic sources are controlled in order to generate seismic waves, and the plurality of sensors records the waves reflected by the oil or gas deposits, or other structures. The seismic survey can be repeated at various moments in time, for example every month or every year, in order to again image the subsoil so as to determine the persistent changes over the period in the deposits.

All of these techniques can be used to monitor a production deposit. For these configurations, the purpose of the 4D processing is to determine how and where the petrophysical properties change by evaluating the differences in the seismic data acquired at various moments, in general before the operation of a deposit, this is the reference survey (baseline survey), and after the operation of this same deposit, this is the monitor survey. Currently, the 4D survey solutions have, for purpose, the complete update of a 3D acquisition of the subsoil for a zone considered. In other words, the baseline survey and the monitor survey acquire a substantial volume of seismic data in order to obtain a complete 3D image. Consequently, the current techniques take much time, about several weeks to several months, are relatively not very precise from a repeatability standpoint, because they use non-permanent systems, and generate substantial costs. All of these factors represent a barrier to the development of 4D surveys. Consequently, there is a need to make 4D surveys less expensive, but also to make them faster and more precise.

Thus, the invention has, in particular, for purpose, to improve the sensitivity and consequently the level of detection of the active ultralight seismic systems. FIG. 1 describes an example of an active ultralight seismic detection system. The term ultralight means that a limited number of source-receiver pairs is implemented with respect to a conventional seismic acquisition for which several hundred to several million source-receiver pairs are used. One single source 1 and receiver 2 pair can be seen here. A source antenna and a receiver antenna can also be implemented. A source, respectively receiver antenna comprises an agglomeration of sources, respectively receivers. They are, for example, assembled via welding. The source antenna behaves as if it were a single source and the receiver antenna as a single receiver. An antenna source makes it possible to focus the emission of the waves and a receiver antenna makes it possible to focus the receiving of these waves. This technique is called beam steering. Furthermore, this makes it possible to create a noise filter. Also represented are the aquifer 3, the fault 4, the gas deposit 6, the zone of interest or spot 7 and the place of production 5. The limitation in the number of source-receiver pairs makes the conventional spatial noise suppression methods not very applicable. They can sometimes mask the effects of low production, namely a modification of less than 1% of the seismic properties due to the variations of the physical properties of the spot over the timescale considered. This is, in particular, true on very short timescales, for example about 3 months, a day or an hour, during which the seismic effects induced by the production are low. Detecting these variations makes it possible to anticipate an upcoming effect, such as for example a change in saturation, which can normally be seen over longer periods as well as the associated effects thereof. The effects, over a short period, reveal the early excitation of the zone of interest under the effect of a change.

Thus, there is a necessity to increase the detection sensitivity over short periods for active ultralight seismic systems.

SUMMARY

In order to respond to this problem, the invention has, for purpose, a method for determining the optimum positioning of source-receiver pairs capable of acquiring seismic data comprising the following steps:

a first step of identifying a zone of interest having been the subject of an earlier seismic acquisition in order to obtain an image of the subsoil of same;

a second step of obtaining seismic data acquired during the earlier seismic acquisition of said zone of interest during a time of interest;

a third step of applying a demigration of said seismic data in order to determine the positions of each source-receiver pair having contributed to the image of said subsoil of said zone of interest during said time of interest;

a fourth step of obtaining unprocessed traces for said source-receiver pair positions;

a fifth step of selecting at least one optimum unprocessed trace from among said unprocessed traces;

a sixth step of determining optimum source-receiver pair positions corresponding to said optimum unprocessed trace;

Preferably, the demigration of the third step is carried out by octave range.

Preferably, the earlier seismic acquisition is a 4D acquisition.

Preferably, the fifth step further comprises a selection of optimum unprocessed traces making it possible to detect the best 4D effects.

Preferably, the fifth step further comprises the use of petro-elastic models so as to select the optimum unprocessed traces.

Preferably, the fifth step further comprises a selection that takes account of the surface factors.

Preferably, the fifth step further comprises a selection that takes account of a reference zone used as calibration for seismic variations.

Preferably, the third step further comprises the obtaining of the optimum slope and emission and reception directions of the seismic waves for each source-receiver pair.

Preferably, the method further comprises a seventh step of placing source-receiver pairs at said optimum positions and an eighth step of acquiring new seismic data at said optimum positions.

Preferably, the eighth step is based on the optimum slope and emission and reception directions of the seismic waves.

BRIEF DESCRIPTION OF THE DRAWINGS

The invention will be best understood upon reading the following description, given in reference to the appended figures, wherein.

DETAILED DESCRIPTION

The use of chemical agents, such as polymers, during the extraction of fluids located in a subsoil, is known from the prior art. They make it possible to improve the yield of the recovery rate greater than 10%. The use of these chemical agents is even more justified in the cases of secondary recovery of fluid. These polymers are injected upstream of a secondary recovery phase, i.e. another injection, so as to create a means of thrust, having effects similar to those of a piston, and which will then be thrust. Moreover, in most cases, a 2D or 3D seismic has already been acquired and processed. This makes it possible to have access, in particular, to information such as a speed model, a migrated seismic image, a model of multiples, seismic unprocessed and processed traces as well as the exact location of the sources and receivers, in particular used for the existing 2D or 3D image, and a static model for the land data. The knowledge and the interpretation of the subsoil make it possible to obtain information such as the elastic properties of the rocks of the target and the expected seismic production effect, i.e. the variation in the elastic properties under the effect of production. Knowledge of the terrain also makes it possible to supplement in particular the information such as a surface obstruction (road, pipeline, well, platform, factory, dwelling, etc.) or a non-repeatable seismic noise generator.

Figure 1:
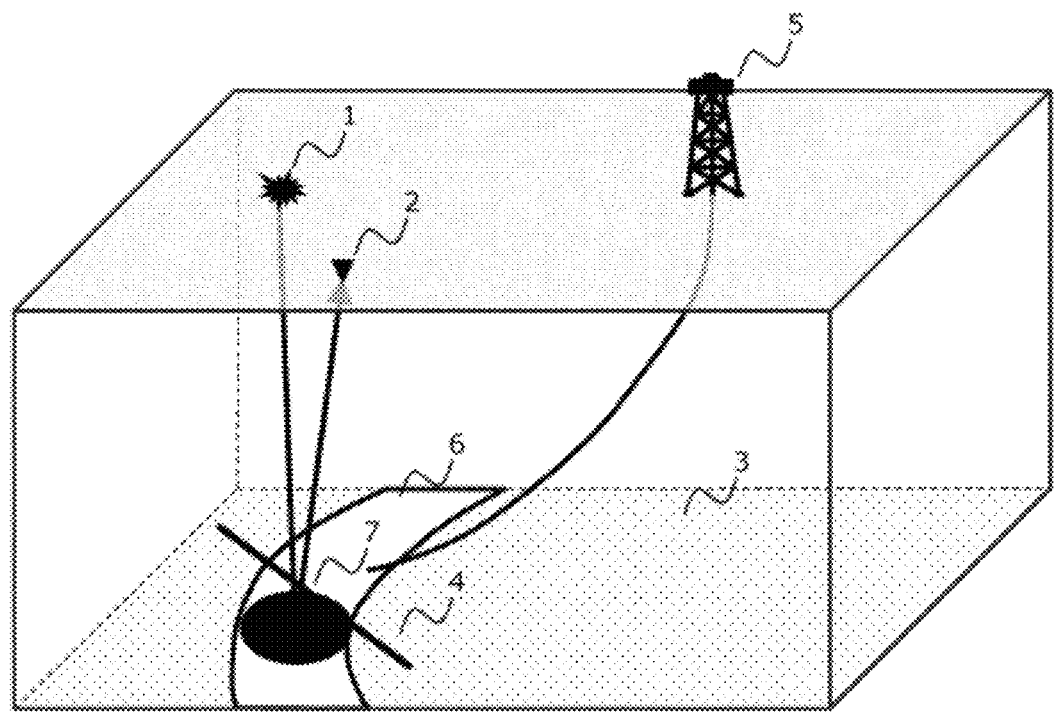
FIG. 1 shows an example of an active ultralight seismic detection system.
Figure 2:
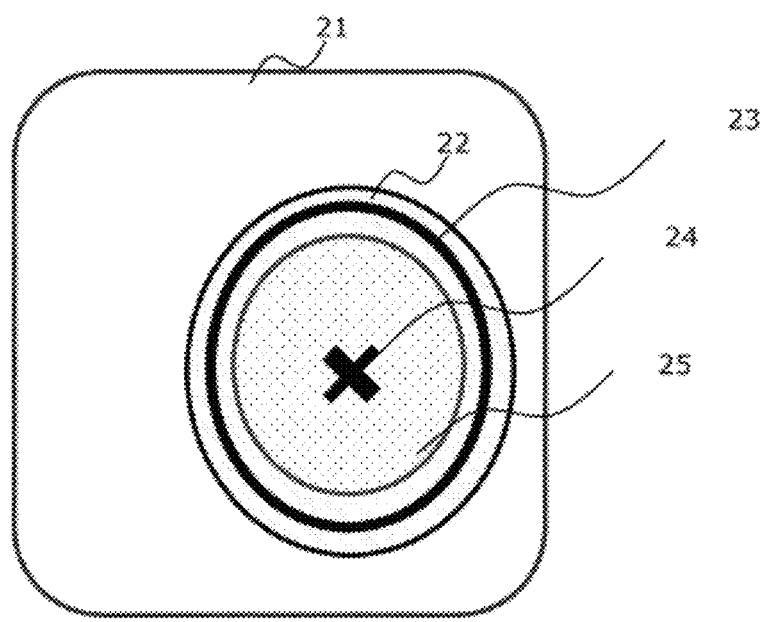
FIG. 2 shows an embodiment of the present invention.

The invention has in particular, for purpose, the incorporation of a seismic contrast agent into the fluid injections, able to be liquid or gas in order to improve the seismic acquisitions implementing ultralight seismic detection systems. Most of the ultralight seismic detection systems aim to detect the changes linked to the production of a fluid or of a gas. Chemical agents, such as polymers, are used to improve the recovery rate of the oil to be extracted. One of the embodiments of the invention consists of injecting, as a complement to the chemical agents and/or injection fluid, a seismic contrast agent that substantially amplifies or decreases the seismic response. This makes it possible to increase the seismic response of the injection and therefore to be able to detect, as quickly as possible, the arrival of the front of the fluid injected into the monitored zone. Most of the time, the chemical agents are in front of the front and thus form what can be called a chemical piston. Such a chemical agent, liquid or gas, is injected inside the chemical piston, in front of or behind the latter. Preferably, the seismic contrast agent must be neutral with regards to the chemical piston, i.e. it must not reduce the properties of the chemical agent used. The seismic contrast agent can contain high-density or low-density nanoparticles and/or nanoparticles with a resonant frequency that is compatible with seismic acquisitions. The seismic contrast agent can also contain an inert gas such as nitrogen. It can also comprise a polymer. FIG. 2 shows an oil slick 21 into which is injected, by the intermediary of an injector 24, water 25 and polymers 22. A seismic contrast agent 23 is also incorporated into the medium of the polymer piston 22.

Figure 3:
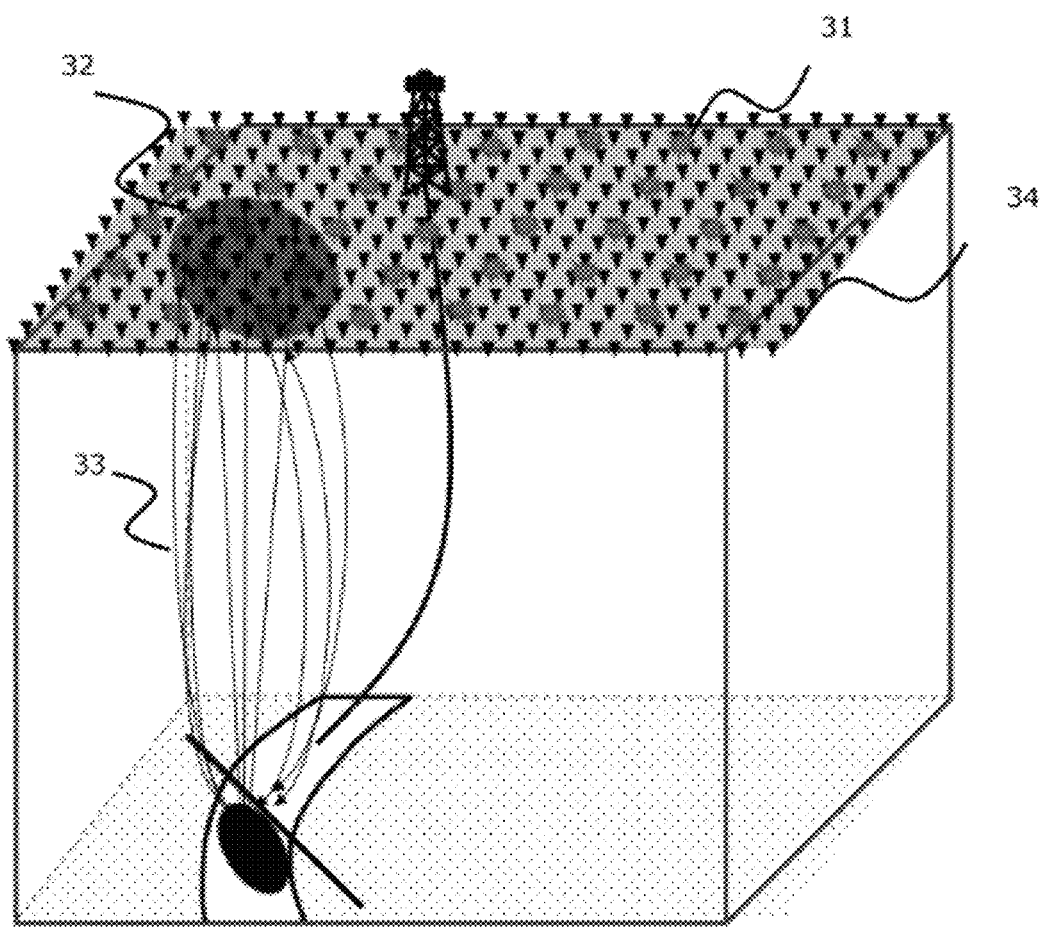
FIG. 3 shows another example of an implementation of the invention.

The invention also has, for purpose, a method making it possible for the improvement of the positioning of the source-receiver pairs and also making it possible for the seismic processing of a single unprocessed trace, namely a recording at the output of the sensor, or averaged over time, i.e. an addition, or stack, in the time of the unprocessed traces, so as to decrease the non-repeatable noise or to increase the strength of the signal, in the framework of a permanent or semi-permanent system. In an embodiment of the invention, the zone subjected to the detection is identified in order to collect the information available in order to implement the method. The first step is the use of the existing seismic data in or near the zone of interest, also called the spot. This 2D, 3D, 4D seismic data or well are used as a source of information in order to know the path of the seismic waves in the subsoil surveyed and, in particular, in the zone to be detected. Preferably, the firing points centred on the zone to be detected are examined, a first pre-selection is carried out by removing the offsets, i.e. the distances between the firing point and the receiver, which are too noisy for effective detection, i.e. having a signal-to-noise ratio that is too low. A demigration, i.e. an inverse plot of seismic rays, total or partial of the seismic data available is then carried out. This inverted ray plot using the zone of interest makes it possible to retrieve the theoretical positions X, Y and Z of each source and receiver that contributed to the imaging of the spot of interest, but also the time when the zone of interest appears in the unprocessed traces. This time is called the time of interest. This step also makes it possible to determine the arrival slopes of the seismic waves that have illuminated the zone of interest. FIG. 3 shows the implementation of this method. The sources 31 and the receivers 34, the zone of interest or spot 32 and the inverted ray plots 33 during the step of demigration can be seen here. The demigration can also be carried out by octave range, when, for example the geology is complex and requires a finer analysis.

A selection of at least one optimum trace is then implemented. The method is applied to the zone contributing to the imagery of the zone of interest and comprises a step of selection from among three parameters. The first parameter is the effective contribution, i.e. the energy or amplitude of the unprocessed recording, of the source-receiver pairs that made it possible for the construction of the image of the zone of interest in the existing 2D, 3D seismic data or well, but also the global signal-to-noise ratio of the trace. Indeed, not only is the behaviour of the trace examined in the zone of interest, but also outside of the zone of interest in order to detect therein low signal-to-noise ratios. A trace can have a high signal-to-noise ratio in the zone of interest, but low outside of the latter. Preferably, a second parameter is applied relating to the dynamic information namely the existing 4D seismic data and/or the expected production effects and the modelling of the impacts thereof on the seismic trace(s). Preferably, a third parameter is applied relating to the taking into account of the surface information, such as for example the obstructions that prevent a positioning of the sources or receivers, the high noise generators that are to be avoided, the possibility of access to a source of current or internet coverage that must be favoured. In the case where several optimum positions have been identified by the taking into account of the first two parameters, the final selection will be on the surface criteria.

Figure 4:
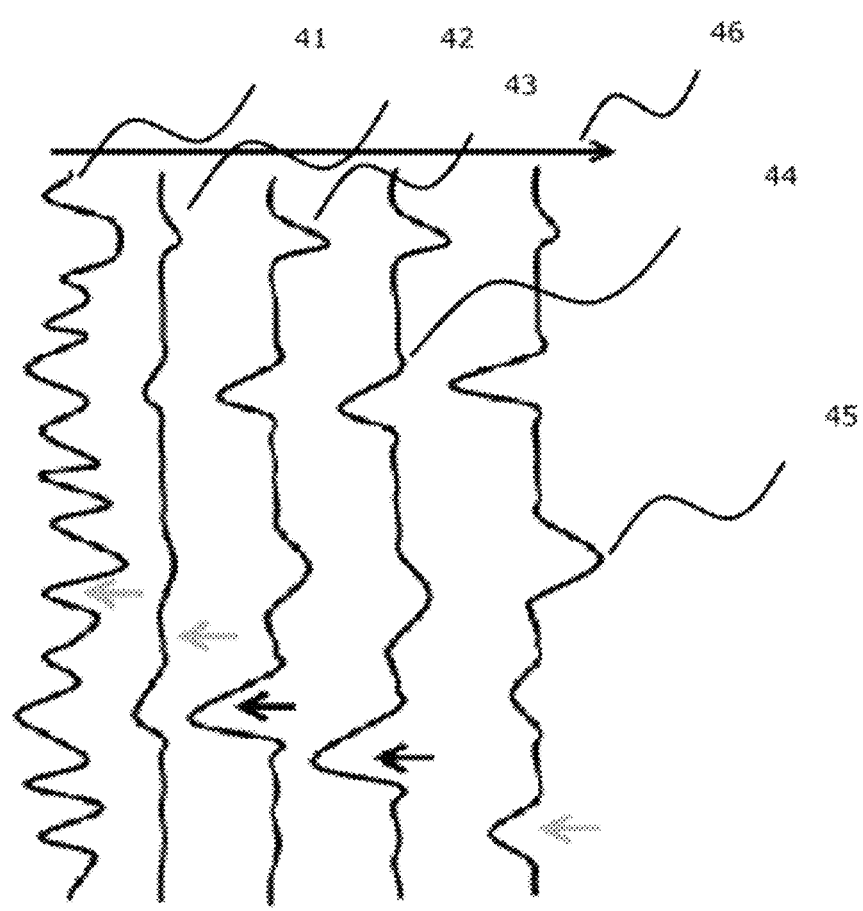
FIG. 4 shows an example of an implementation of the method of selecting at least one optimum trace object of the present invention.

The first parameter is obtained by intersecting the theoretical positions X, Y and Z of the sources and receivers during the step of demigration with the actual acquisition grid of the existing seismic data, the unprocessed traces are recovered i.e. the effective measurements of the subsoil from these positions. Using these unprocessed traces and the time information during which the zone of interest appears on the unprocessed traces, it is possible to carry out a qualitative and quantitative selection on a subset of potentially optimum traces. A trace is optimal when it makes it possible for the detection of a change. The time information is obtained at the step of demigration and is also called the time of interest. The highly noisy traces, or highly attenuated, during the time of interest are discarded. On the contrary, the traces that have a strong reflection, or refraction, which are called clean traces, are retained. A taking into account of the effect of the multiples that are visible on the firing points and/or obtained during the processing of the existing seismic data makes it possible to select traces for which the high multiples do not appear during the time of interest of each trace considered. FIG. 4 shows five traces 41, 42, 43, 44 and 45. The axis 46 on the ordinate axis represents the offset, i.e. the source-receiver distance. The trace 41 is too noisy and the traces 42 and 45 are excessively attenuated during the time of interest. These three traces are therefore not selected. On the other hand, the traces 43 and 44 have a good signal-to-noise ratio and an energy that is visible during the survey time of the zone of interest, they are therefore considered as potentially optimal and are thus retained. The second parameter relates to the dynamic information that can be obtained when the 4D seismic data is available. It is possible, using complete 4D images, to detect if a change has already affected the zone of interest considered. If such is the case, the analysis of the unprocessed traces obtained and coming from base and later acquisitions makes it possible to determine the traces that have the best 4D effects for the zone of interest. These traces are those that contributed the most to the identification of this change and are thus optimal for detecting therein new 4D effects. As a supplement of the existing 4D seismic traces, or when the latter are not available, using petro-elastic models for the zone of interest combined with the dynamic deposit model makes it possible to model a synthetic seismic acquisition that estimates the seismic effects induced by the production.

The third parameter relates to the information concerning the surface factors obtained from the subset identified by the first parameter or the combination of the first two parameters, it is possible to cross the position of the selected source-receiver pairs with the surface information. This crossing of information makes it possible to verify, on the one hand, the practical feasibility of the positioning of these source-receiver pairs, by checking, for example, that the selected positions are not located in an exclusion zone. It also makes it possible to take account of the high seismic noise generators that can appear between the existing seismic data, such as, for example, a road under construction, a gas compression unit or a maritime corridor.

These steps make it possible to analyse the feasibility of the active ultralight seismic detection.

Figure 5:
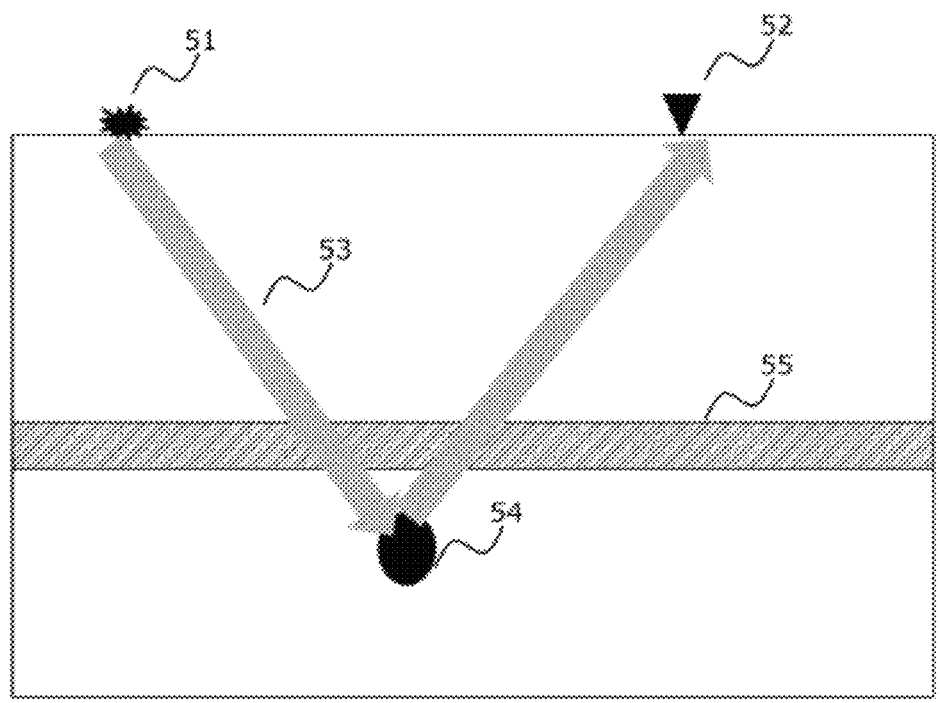
FIG. 5 shows a seismic wave passing through a reference zone.
Figure 6:
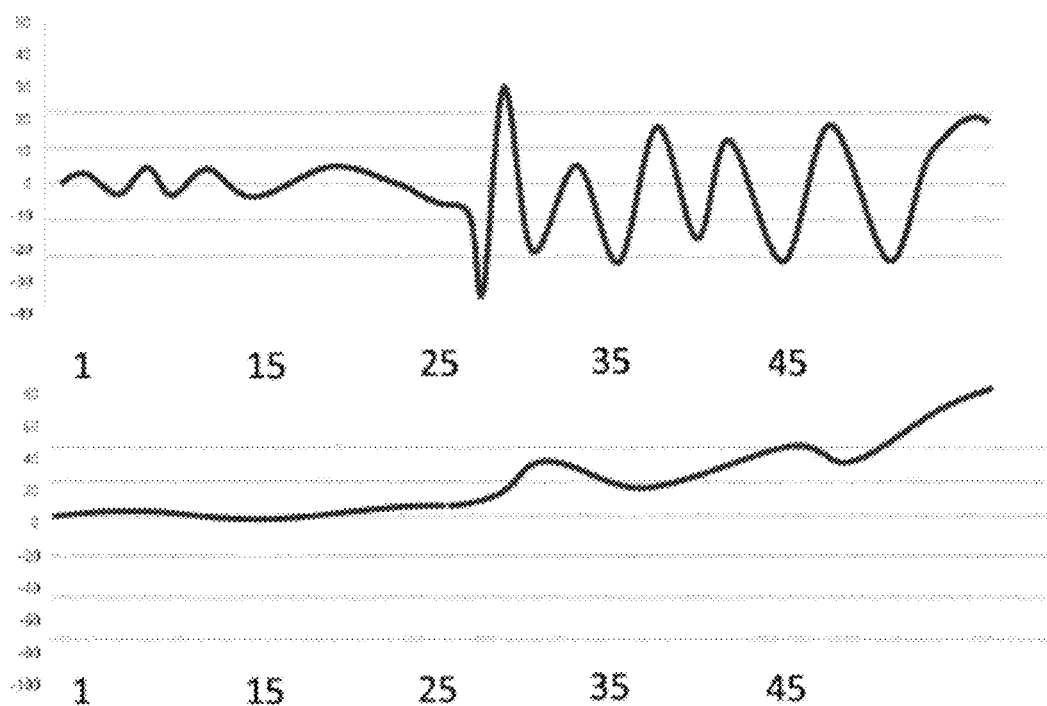
FIG. 6 shows an example of processing a seismic unprocessed trace by the method implemented in the present invention.

The method described until now can be supplemented in order to improve the seismic processing of the active ultralight systems and in order to detect the changes in the zone of interest when the source-receiver pairs have been placed at the optimum locations, permanently or semi-permanently. This makes it possible to focus the detection on the zone of interest without constructing a complete image of the subsoil. This is a trace-to-trace approach, wherein each of the source-receiver pairs are observed and processed independently of one another. In order to overcome the changes taking place above the zone of interest, the assumption is made that on a very short timescale, of about a maximum of 6 months, it is possible to identify in the subsoil, at least one zone above the zone of interest that is not subject to a change. This zone is called the reference zone. It is used to obtain a measurement of the ambient noise associated with an ultralight detection system. It is also used to correct the variations that arrive above this reference zone. In order to correct the 4D effects located above the reference zone, where the variations close to the surface are more substantial, the reference zone is used as a calibration by considering that the seismic response of this zone must not change. It is thus possible to correct the seismic variations of this zone and to apply this correction so as to reveal the variations in the zone of interest. These are variations over the time of the amplitude, the travel time or of the wavelets. The source 51, the receiver 52, the seismic wave 53, the zone of interest 54 and the reference zone 55 described above can be seen in FIG. 5. The FIG. 6 shows an example of an application to an unprocessed trace of the method that is the subject of the present invention. On the abscissa, the time in days and on the ordinate axis the difference in travel time of the seismic wave over the course of time are indicated. The starting point of the travel is the seismic source, then the deposit and finally the receiver. The upper curve corresponds to a daily recording and the lower curve to the derivative with respect to the first day of recording. A substantial variation on the $25^{th}$ day is observed which means that a geomechanical change has occurred. This geomechanical change can be, for example, a saturation, a pressure or temperature modification.

Moreover, when consideration is given to a single seismic trace coming from an ultralight acquisition, the notion of cell, or bin, no longer has any meaning. The spatial resolution of the detected zone is considered as being the Fresnel zone, which itself depends on the frequency. It is then possible to filter by octave in order to refine the sensitivity of the detection. By lowering the frequency of the data received, the sensitivity of the detection in the zones of interest that are farther away is increased. So that this can be possible, the ultralight acquisition system must have emitted and recorded several frequency ranges. For example, for a speed of 5500 metres per second at the zone of interest, the Fresnel zones located at 50, 100, 150, 200 and 275 metres from the centre of the spot correspond respectively to frequencies of 27, 14, 9, 7 and 5 Hertz, for a homogeneous speed model and a zero offset acquisition model. As such for a detection of a change at 5 Hertz and which does not appear at 14 Hertz, this makes it possible to deduce that the change observed in the zone of interest intervenes between 100 and 275 metres from the centre of the zone of interest.

On the other hand, by using the information obtained in the step of demigration, it can be estimated for each source-receiver pair the emission and reception slope of the seismic waves in order to illuminate the zone of interest. In emission, it is possible to focus the emission of the waves, or beam steering, in the slope and the optimal directions for the illumination of the zone of interest by using several sources or a source antenna. Thus, many noise factors such as diffraction, parasitic and multiple echoes and parasite reflections are avoided, and the threshold of detectability is improved. In reception, it is possible, by using three-component receivers, by averaging a cluster of close sensors or by using a receiver antenna, to obtain an average trace that contains only the seismic information arriving according to the direction and the slope defined in the step of demigration. This filtering makes it possible to substantially reduce the noise factors, in particular the multiples, and to increase the threshold of detectability. This entails increasing the detection precision by reducing the detection zone within the Fresnel zone and thus better focus the detection by adjusting the slopes of the beam steering. It is thus possible, with a single source-receiver pair, to obtain several different focalisations within this Fresnel zone which is the same as discriminating in this zone, several different spots. These two filterings can be implemented independently or together in order to further increase the threshold of detectability. If the demigration was carried out by octave range, it is then possible to refine even further this filtering by modifying the emission and reception slopes according to the octaves. The invention thus makes it possible to conclude a detection that takes account, on the one hand, of the variations over time in the zone of interest with respect to a reference zone and, on the other hand, of the temporal changes in these variations.

The invention can also be implemented to record a complete trace that can then be used to identify other spots referred to as opportunities located above or below the initial spot and to adjust for each one the focalisation in the Fresnel zone.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for determining the optimum positioning of source-receiver pairs capable of acquiring seismic data comprising the following steps:
    a first step of identifying a zone of interest having been the subject of an earlier seismic acquisition previously used to obtain an image of the subsoil of same;
    a second step of obtaining seismic data acquired during the earlier seismic acquisition of said zone of interest during a time of interest;
    a third step of applying a demigration, in the form of an inverse plot of seismic rays, of said seismic data in order to determine the positions of each source-receiver pair having contributed to the image of said subsoil of said zone of interest during said time of interest;
    a fourth step of obtaining unprocessed traces from said earlier seismic acquisition for said source-receiver pair positions;
    a fifth step of selecting at least one optimum unprocessed trace from among said unprocessed traces;
    a sixth step of determining optimum source-receiver pair positions corresponding to said optimum unprocessed trace; and
    displaying a plot of the newly acquired seismic data as a function of time.

2. The method according to claim 1, wherein the demigration of the third step is carried out by an octave range.

3. The method according to claim 2, wherein the earlier seismic acquisition is a 4D acquisition.

4. The method according to claim 2, wherein the fifth step further comprises the use of petro-elastic models in order to select the at least one optimum unprocessed traces.

5. The method according to claim 2, wherein the fifth step further comprises a selection that takes account of the surface factors.

6. The method according to claim 2, wherein the fifth step further comprises a selection that takes account of a reference zone used as calibration for seismic variations.

7. The method according to claim 1, wherein the earlier seismic acquisition is a 4D acquisition.

8. The method according to claim 7, wherein the fifth step further comprises a selection of unprocessed traces allowing to identify a change in the zone of interest.

9. The method according to claim 8, wherein the fifth step further comprises the use of petro-elastic models in order to select the at least one optimum unprocessed traces.

10. The method according to claim 8, wherein the fifth step further comprises a selection that takes account of the surface factors.

11. The method according to claim 7, wherein the fifth step further comprises the use of petro-elastic models in order to select the at least one optimum unprocessed traces.

12. The method according to claim 7, wherein the fifth step further comprises a selection that takes account of the surface factors.

13. The method according to claim 1, wherein the fifth step further comprises the use of petro-elastic models in order to select the at least one optimum unprocessed traces.

14. The method according to claim 13, wherein the fifth step further comprises a selection that takes account of the surface factors.

15. The method according to claim 1, wherein the fifth step further comprises a selection that takes account of the surface factors.

16. The method according to claim 1, wherein the fifth step further comprises a selection that takes account of a reference zone used as calibration for seismic variations.

17. The method according to claim 1, wherein the third step further comprises the obtaining of a slope and emission and reception directions of the seismic waves for each source-receiver pair.

18. The method according to claim 1, wherein the method further comprises a seventh step of placing source-receiver pairs at said optimum positions and an eighth step of acquiring new seismic data at said optimum positions.

19. The method according to claim 18, wherein the eighth step is based on a slope and emission and reception directions of the seismic waves.

20. A method for acquiring seismic data comprising the following steps:
- a first step of identifying a zone of interest having been the subject of an earlier seismic acquisition previously used to obtain an image of the subsoil of same;
- a second step of obtaining seismic data acquired during the earlier seismic acquisition of said zone of interest during a time of interest;
- a third step of applying a demigration, in the form of an inverse plot of seismic rays, of said seismic data in order to determine the positions of each source-receiver pair having contributed to the image of said subsoil of said zone of interest during said time of interest;
- a fourth step of obtaining unprocessed traces from said earlier seismic acquisition for said source-receiver pair positions;
- a fifth step of selecting at least one unprocessed trace from among said unprocessed traces;
- a sixth step of determining source-receiver pair positions corresponding to said selected at least one unprocessed trace;
- a seventh step of placing source-receiver pairs at said source-receiver pair positions corresponding to said selected at least one unprocessed trace; and
- an eighth step of acquiring new seismic data at source-receiver pair positions corresponding to said selected at least one unprocessed trace; and
- a ninth step of displaying a plot of the newly acquired seismic data as a function of time.

* * * * *